United States Patent [19]

Kluge

[11] 4,437,257
[45] Mar. 20, 1984

[54] FOAMED PLASTIC FISHING LURE BODY HAVING A CONTROLLED DENSITY AND A ONE-PIECE WIRE AND A METHOD FOR ITS MANUFACTURE

[76] Inventor: Douglas J. Kluge, 7979 Jonellen La., Golden Valley, Minn. 55427

[21] Appl. No.: 263,897

[22] Filed: May 15, 1981

[51] Int. Cl.³ .............................................. B29D 27/00
[52] U.S. Cl. ................................. 43/42.45; 43/42.47; 43/42.53; 264/46.7; 264/46.9; 425/543; 425/812; 425/817 R
[58] Field of Search ................... 264/46.7, 46.9, 46.5, 264/46.6, 129; 43/42.53, 42.45, 42.47; 425/812, 543, 817 R

[56] References Cited

U.S. PATENT DOCUMENTS

| | | | |
|---|---|---|---|
| 1,472,638 | 10/1923 | Dickman | 43/46 |
| 2,006,604 | 7/1935 | Post | 43/46 |
| 2,437,549 | 3/1948 | Pecher | 43/46 |
| 2,536,553 | 1/1951 | La Fleur | 43/42.48 |
| 2,718,033 | 9/1955 | Burke | 43/42.53 X |
| 2,756,535 | 7/1956 | Dean | 43/42.48 |
| 3,070,917 | 1/1963 | Rowe, Sr. | 264/46.9 X |
| 3,137,744 | 6/1964 | Burrus | 264/46.5 |
| 3,218,750 | 11/1965 | Lewin | 43/42.45 X |
| 3,266,099 | 8/1966 | Bucy | 425/812 X |
| 3,367,057 | 2/1968 | Pond | 43/42.47 X |
| 3,369,336 | 2/1968 | Buzicky | 264/46.5 X |
| 3,511,736 | 5/1970 | Nielsen, Jr. et al. | 264/46.9 X |
| 3,877,168 | 4/1975 | Stevens | 43/42.31 |
| 4,216,605 | 8/1980 | Showalter | 264/46.7 X |
| 4,359,435 | 11/1982 | Kogure | 425/812 X |

Primary Examiner—Philip E. Anderson
Attorney, Agent, or Firm—Burd, Bartz & Gutenkauf

[57] ABSTRACT

A fishing lure having a minnow-shaped foamed plastic body and a one-piece wire located in the central longitudinal vertical plane of the body. The wire has a nose loop at the forward end of the body, a body loop at the lower mid-section of the body, and a tail loop at the rear end of the body. Treble hooks are connected with rings to the body and tail loops. A generally flat lip projects forwardly and downwardly from the nose section of the body. The body is made with a mold assembly having two plates with a plurality of body cavities and loop grooves for supporting the wire along the longitudinal central plane of each cavity. The mold assembly has a plastic material inlet passage leading to the nose section of each cavity and a vent passage open to the tail sections of each cavity. A gun is used to pressure inject plastic materials into the inlet passage which reacts in the body cavity to form the foamed plastic body.

13 Claims, 12 Drawing Figures

FOAMED PLASTIC FISHING LURE BODY HAVING A CONTROLLED DENSITY AND A ONE-PIECE WIRE AND A METHOD FOR ITS MANUFACTURE

SUMMARY OF INVENTION

The invention relates to a method for making an artificial fishing lure body having a one-piece wire located in the vertical central longitudinal plane of the body. The wire has a forward section having a nose loop, a V-shaped mid-section having a body loop, and a linear rear section having a tail loop. Each loop extends from the body. Treble hooks are connected with rings to the body and tail loops. A flat forwardly and downwardly directed lip is attached to the body between the nose loop and body loop.

The apparatus for making the lure body is a mold assembly having a pair of plates with faces containing a plurality of body cavities. Each body cavity has the outline shape of the lure body. Each plate has a nose loop groove, a body loop groove, and a tail loop groove open to each cavity to accommodate and retain the nose loop, body loop, and tail loop. The wire loops are clamped between plates to locate the wire along the central longitudinal plane of the body cavity. A weight can be clamped to the V-shaped mid-section of the wire. The plates have grooves forming a plastic material inlet passage open to the body cavity. Plastic materials pressure injected into the inlet passage react in the body cavity forming a foamed plastic body. The gas in the body cavity is vented through a vent passage in one of the plates. The foamed plastic enters and blocks the vent passage. The amount of plastic materials injected into the body cavity determines the final density of the foamed plastic of the body. The mold assembly is opened by releasing and separating the plates. The lure body is removed from the mold assembly, painted, and coated with lacquer. A slit is cut into a lower part of the forward end of the body. A flat lip is inserted into the slit and attached to the body with an adhesive. The treble hooks are connected with rings to the body and tail loops.

IN THE DRAWINGS

DESCRIPTION OF PREFERRED EMBODIMENT

Figure 1:
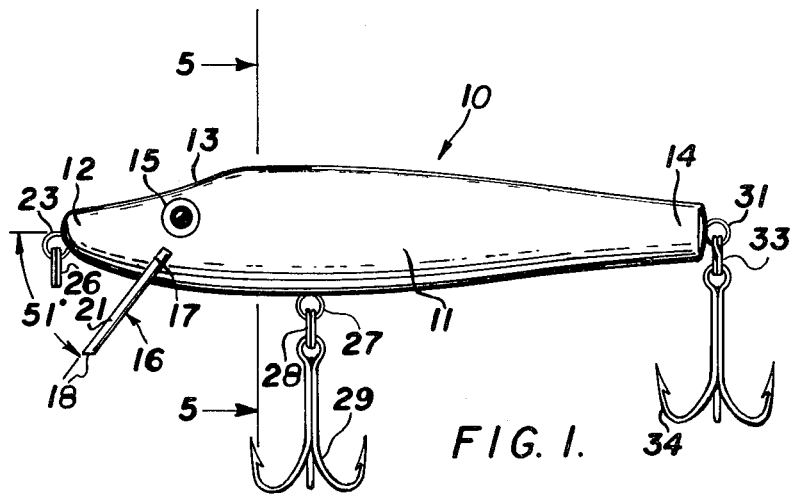
FIG. 1 is a side elevational view of the fishing lure of the invention made according to the method of the invention.
Figure 3:
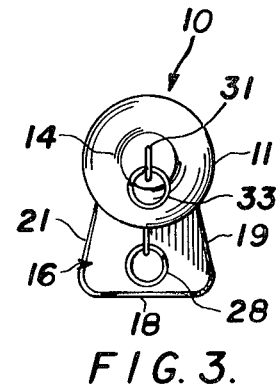
FIG. 3 is a rear elevational view of FIG. 1 with the treble hooks removed.
Figure 2:
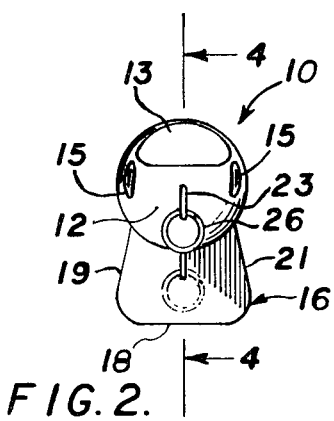
FIG. 2 is a front elevational view of FIG. 1 with the treble hooks removed.
Figure 4:
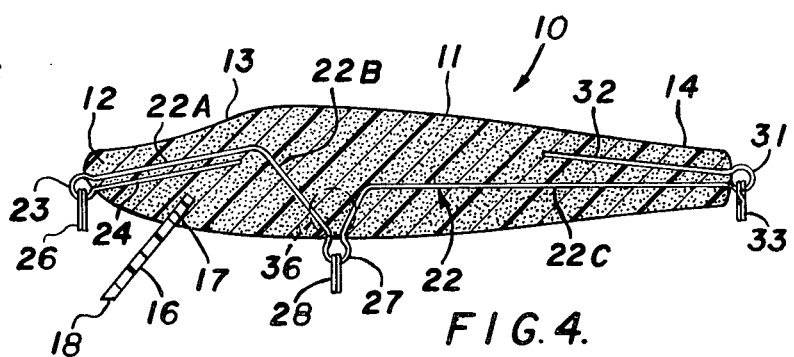
FIG. 4 is a longitudinal sectional view taken along the line 4—4 of FIG. 2.
Figure 5:
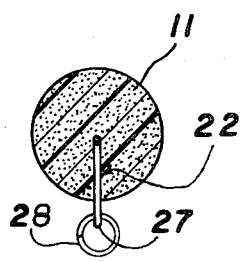
FIG. 5 is a sectional view taken along the line 5—5 of FIG. 1 with the treble hook removed.
Figure 6:
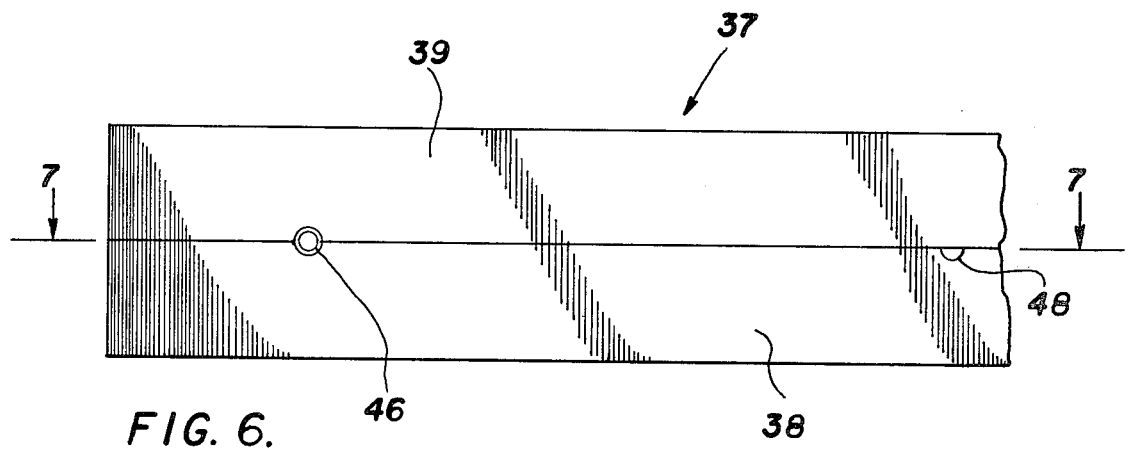
FIG. 6 is a fragmentary side elevational view of a mold assembly for making the one-piece foam plastic lure body.

Referring to FIGS. 1-5, there is shown a fishing lure indicated generally at 10 having a one-piece body 11 of foam plastic, such as a framable polyurethane and the like. Body 11 has a generally elongated cylindrical minnow shape with a forward nose 12 having a slightly concave forward upper surface or head 13. Head 13 has a generally elliptical shape with the major axis located along the vertical longitudinal central plane of body 11. The rear portion of body 11 has a tapering tail 14 having a generally truncated cone shape with convergingly tapers to the rear end of the body. A pair of eyes 15 are located adjacent opposite sides of head 13. Eyes 15 are discs having central dots. The discs and dots have contrasting colors, as black, silver, and gold. Other colored discs and dots can be used to simulate eyes. The discs are preferably hot stamp silver or gold leaf foil bonded to opposite sides of the forward end of body 11.

A generally flat lip 16 extends downwardly and forwardly from body 11 below eyes 15. Lip 16 is a flat member that fits into a transverse inclined slot 17 in the lower portion of body 11. The eyes 15 are generally aligned with the flat plane of lip 16. An adhesive secures lip 16 to body 11. Lip 16 has a transverse linear lower edge 18 and upwardly inwardly tapering side edges 19 and 21. Rounded lower corners join the side edges 19 and 21 with opposite ends of the transverse edge 18. Lip 16 extends forwardly and downwardly from body 11 at an angle of about 55 degrees with respect to the longitudinal center line of body 11. Lip 16 can have other shapes and be inclined at other angles relative to the longitudinal axis of body 11.

A single or one-piece wire 22 is located along the vertical longitudinal center plane of body 11. Wire 22 has a forward section 22A extended through the forward end of nose 12 forming a nose loop 23. An inwardly directed end 24 of the wire extends back into the body 11 below and generally parallel to the forward section 22A. Wire 22 has a generally V-shaped mid-section 22B, which extends through the lower portion of body 11 forming a body loop 27. A ring 28 in loop 27 is connected to a treble hook 29. Wire 22 has a linear rear section 22C having an end extended through the rear of tail 14 forming a tail loop 31. A rear end 32 of the wire 22 extends inwardly into body 11 above and in vertical alignment with the rear section 22C. A ring 33 in loop 31 is connected to a treble hook 34. Body 11 is painted with selected color combinations and designs. A clear urethane coating is then applied to body 11 to protect the painted design. The colors and designs on body 11 are not part of the present invention. This lure body has a density less than the density of water and is used to make a floating fishing lure. A clam shell lead weight 36 indicated by broken lines in FIG. 4 can be clamped to the V-shaped section 22B of wire 22. The weight is located symmetrically on the vertical central plane and below the longitudinal center line. The low central location of weight 36 stabilizes the lure so it does not roll over on its back or heel to one side or stand up on one end in the water.

Figure 10:
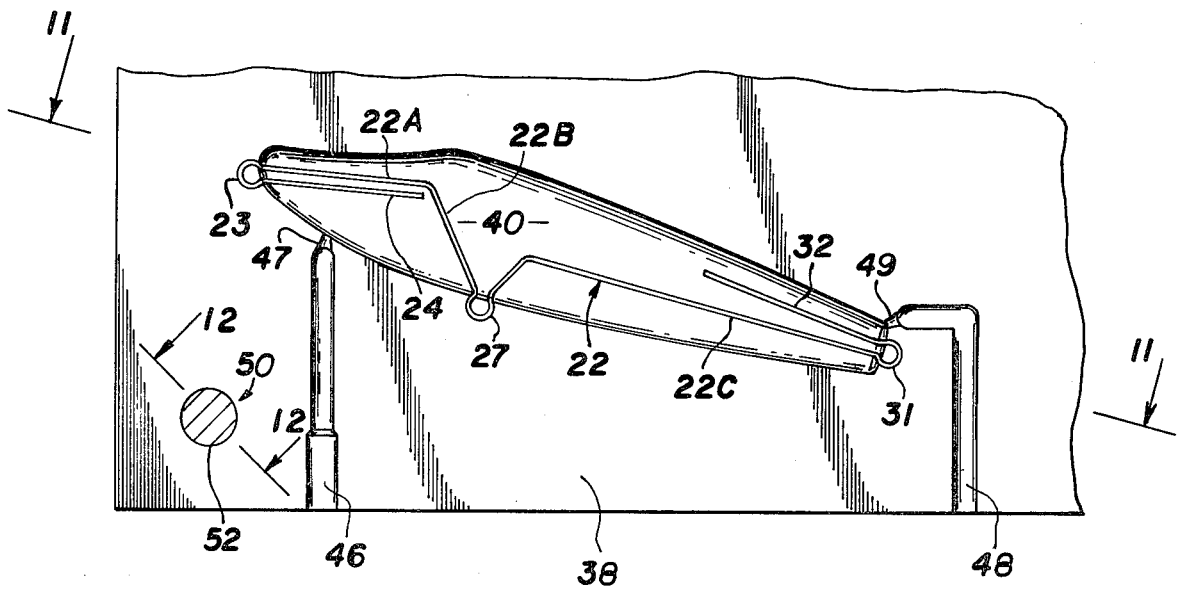
FIG. 10 is a view similar to FIG. 7, showing the one-piece wire located on the mold plate over the mold cavity.
Figure 11:
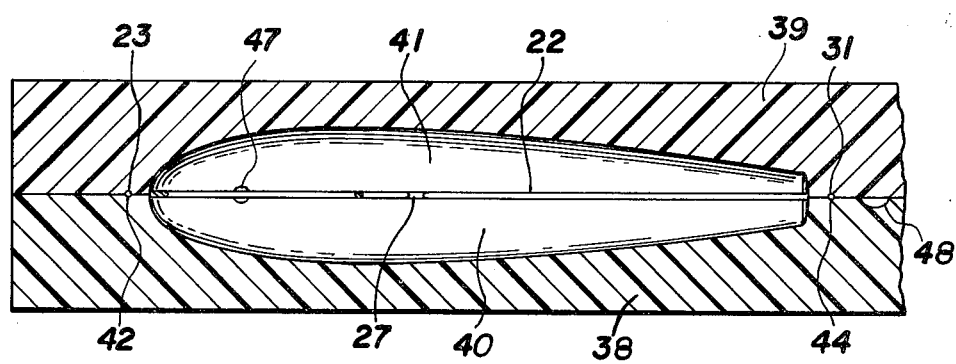
FIG. 11 is a sectional view of the mold assembly showing the one-piece wire located between the upper and lower mold plates across the mold cavity, as viewed along the line 11—11 of FIG. 10 when the upper mold plate has been positioned on the lower mold plate.
Figure 12:
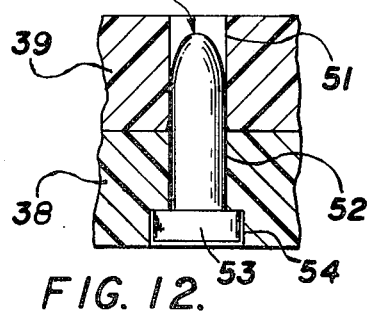
FIG. 12 is a sectional view taken along the line 12—12 of FIG. 10.

The apparatus for and process of molding body 11 is shown in FIGS. 6–12. A mold assembly indicated generally at 37 has first and second plates 38 and 39 having a plurality of mold cavities whereby a plurality of bodies can be simultaneously molded. The mold cavities are in pairs and extend along the longitudinal length of the mold assembly. For example, the mold assembly 37 can have 4, 6, or 8 cavities. As shown in FIG. 12, an upright registration or locator pin 50 is mounted on plate 38. Pin 50 projects through a hole 51 in plate 38 and above the surface or face of the plate 38. Pin 50 has a head 53 located in a counter bore or recess 54 in the bottom of plate 38. The body of pin 50 has a press fit in hole 52. The upper end of pin 50 is rounded and extends with a slip fit into a guide or registration hole 51 in plate 39. The opposite diagonal corners of plates 38 and 39 have a similar pin and registration hole to provide registration of the mold cavities and plastic material inlet passages located in plates 38 and 39. A single mold cavity is shown in FIGS. 7–11. The remaining cavities in the mold assembly are identical. The mold cavities can be of different sizes, thereby allowing different body sizes to be made with a single mold assembly.

As shown in FIG. 11, plate 38 has a cavity 40. Plate 39 has a cavity 41. Cavity 41 is the same size as and a mirror image of cavity 40. The combined cavities 40 and 41 form a body cavity having the outline shape of lure body 11.

Figure 7:
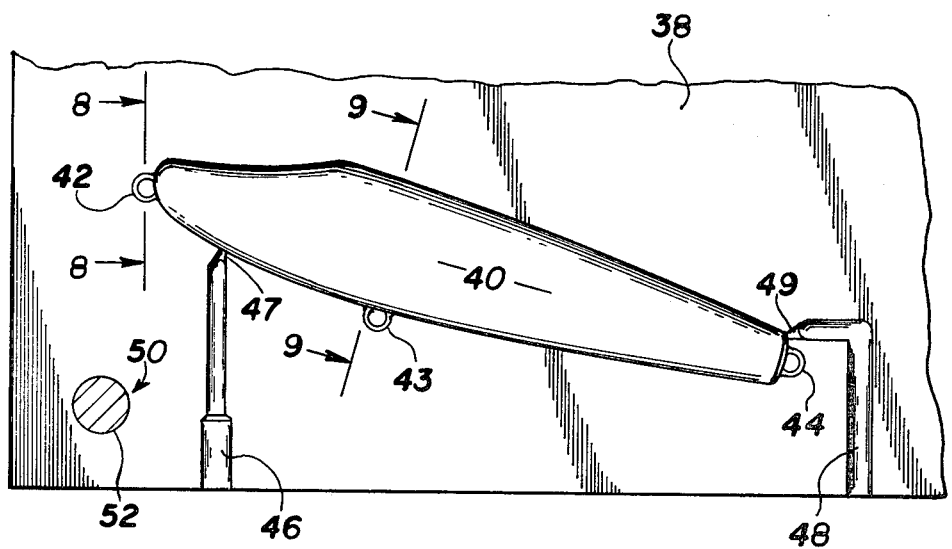
FIG. 7 is an enlarged view of the top surface of the lower mold plate taken along the line 7—7 of FIG. 6.
Figure 8:
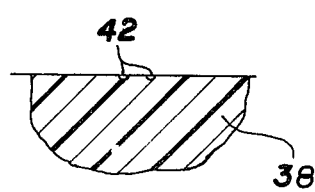
FIG. 8 is an enlarged sectional view taken along the line 8—8 of FIG. 7.
Figure 9:
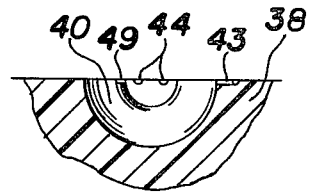
FIG. 9 is a sectional view taken along the line 9—9 of FIG. 7.

Referring to FIG. 7, the top face of plate 38 is a flat surface having a nose loop groove 42 having ends open to the forward end of cavity 40 to accommodate nose loop 23. A body loop groove 43 is located in plate 38 adjacent the mid-portion of cavity 40. Groove 43 has ends open to cavity 40. A tail loop groove 44 in plate 38 has ends open to the tail portion of cavity 40. Grooves 42, 43, and 44 are generally circular and have semi-circular cross sections, as shown in FIGS. 8 and 9. Grooves 42 and 44 are located at opposite ends of cavity 40 generally along the longitudinal central axis of body cavity 40–41. An inlet groove 46 providing a port or passage in plate 38 extends from an outer edge of plate 38 to an inlet or entrance opening 47 open to a lower nose portion of cavity 40. Entrance opening 47 opens to cavity 40 in the area that is subsequently cut or slit for accommodating lip 16. Plate 38 has a gas exhaust groove 48 providing a vent port leading from an exit opening 49 open to the tail portion of cavity 40 to the outside edge of plate 48.

In the process of making the lure body 11 the wire 22 is formed with the nose loop 23, body loop 27, and tail loop 31. The ends 24 and 32 are in longitudinal alignment with the forward section 22A, generally V-shaped mid-section 22B, and linear tail section 22C. Weight 36 can be clamped onto section 22B if a sinking lure is to be made. The one-piece wire 22 is placed on mold plate 38, as shown in FIG. 10, with the nose loop 23 in nose loop groove 42, body loop 27 in body loop groove 43, and tail loop 31 in tail loop groove 44. This locates the wire along the vertical central longitudinal plane of the combined mold cavities or body cavity 40–41, as shown in FIG. 11. The second mold plate 39 is assembled on the first mold plate 38 with cavity 41 in registration with cavity 40. This closes the mold assembly. Registration pin 50 cooperates with guide hole 51 to locate plate 39 on plate 38. The mold plate 42 has a nose loop groove, body loop groove, and tail loop groove that correspond to the grooves 42, 43, and 44 and accommodate portions of the wire loops 23, 27, and 31.

The plates 38 and 39 are pressed or clamped together. Clamping press or clamp structures are used to hold the plates 38 and 39 together. A pressure injection gun is used to inject liquid plastic materials into the mold body cavity 40–41. Separate liquid plastic materials are mixed in an injector gun and pressure fed into the body cavity 40–41 via inlet passage 46. The plastic materials react with each other in the body cavity to form a foam plastic body. The amount of injected liquid plastic materials is carefully controlled in each cavity in order that the density of the plastic and the weight of each body will be alike. The air and gas in the cavity 40–41 exit via vent port 49 and passage 48 to the atmosphere. The liquid plastic materials, as they react in cavity 40–41, expand and flow into vent port 49 and passage 48. This plastic material will cool and block vent port 49 so that continued reaction of the plastic materials in cavity 40–41 will increase the pressure of the foam plastic material in the cavity and thereby increase the density of the foam plastic material.

After the reaction of the liquid plastic materials has been completed, the mold assembly 37 is opened. This is accomplished by releasing the clamps on the mold plates 38 and 39. The plates 38 and 39 are separated and lure body 11 is removed from the mold assembly. Body 11 is finished by applying several layers of paint having selected designs and color combinations. For example, the color combinations can be red and white or red and gold. Eyes 15 are a hot stamped silver or gold leaf foil. A black dot is included in each eye. Slot 17 is then cut into the lower nose section 12 of the body in general alignment with eyes 15. The lip 16 is inserted into the slot 17 and secured thereto with an adhesive.

The fishing lure is completed by placing rings 26, 28, and 33 in loops 23, 27, and 31. Treble hooks 29 and 34 are attached to the rings 28 and 33.

While there has been shown and described a preferred embodiment of the fishing lure and mold assembly and method of making the fishing lure, it is understood that changes in the materials, structures, and shapes can be made by those skilled in the art without departing from the invention. The invention is defined in the following claims.

The embodiments of the invention in which an exclusive property or privilege is claimed are defined as follows:

1. A method of making a foamed plastic fishing lure body having a controlled density and a one-piece wire located along the vertical central longitudinal plane of the body, with a mold assembly having a first plate and a second plate and groove means for accommodating portions of the wire adapted to be located in face-to-face relationship relative to each other, said first and second plates each having at least one cavity and groove means for accommodating portions of the wire, said cavities forming a body cavity having the outline shape of the lure body when the first and second plates are located in face-to-face relationship comprising: positioning the one-piece wire on the first plate by placing portions of the wire in the groove means of the first plate to locate the wire over the cavity in the first plate, closing the mold assembly by mounting the second plate on the first plate to locate the cavity of the second plate in registration with the cavity of the first plate and locate the wire in the groove means of the second plate thereby locating the wire along the vertical central longitudinal plane of the body cavity, holding the mold assembly in its closed position, introducing plastic materials into the body cavity, through a passageway in the mold assembly said plastic materials reacting to form a foamed plastic filling the body cavity and surrounding the wire extended through said body cavity, allowing gas to exhaust from the body cavity through vent means in the mold assembly during the reaction of the plastic materials and filling of the body cavity with foamed plastic, terminating the exhaust of gas from the body cavity and continuing the reaction of the plastic materials to increase the density of the foamed plastic in the body cavity, opening the mold assembly by separating the first plate from the second plate, and removing the foamed plastic body and wire from the mold assembly.

2. The method of claim 1 wherein: said wire has a nose loop at the forward end thereof and a tail loop at the rear end thereof, said groove means including first groove means on the first and second plates at the forward end of the body cavity and second groove means on the first and second plates at the rear end of the body cavity, including locating the nose loop in the first groove means, the tail loop in the second groove means, and the remainder of the wire along the vertical central longitudinal plane of the body cavity.

3. The method of claim 1 wherein: said wire has a nose loop, a body loop, and a tail loop, said groove means of the first and second plates comprising a first groove for accommodating the nose loop, a second groove for accommodating the body loop, and a third groove for accommodating the tail loop and including locating the nose loop in the first groove, the body loop in the second groove, the tail loop in the third groove, and the remainder of the one-piece wire being located along the vertical central longitudinal plane of the body cavity.

4. A fishing lure body made according to the method of claim 1, said lure body having a plastic body, said body having a nose and tail, a one-piece wire located along the vertical central plane of the body, said wire having a first loop projected from the nose, a second loop projected downwardly from a mid-section of the body, and a third loop projected from the tail.

5. The lure body of claim 4 wherein: said wire has a first end section extended from the first loop into the body, and a second end section extended from the third loop into the body.

6. The lure body of claim 5 wherein: said wire has a generally V-shaped central section, said second loop being located at the apex of the V-shaped central section.

7. The lure body of claim 4 wherein: said wire has a generally V-shaped section, said second loop being located at the apex of the V-shaped section.

8. A method of making a foamed plastic body having a controlled density and wire located within the body, with a mold assembly having a first plate and a second plate and means for accommodating portions of the wire adapted to be located in face-to-face relationship relative to each other, said first and second plates each having at least one cavity forming a body cavity having the outline shape of the body when the first and second plates are located in face-to-face relationship comprising: positioning the wire on the first plate by locating portions of the wire in the means for accommodating portions of the wire over the cavity in the first plate, closing the mold assembly by mounting the second plate on the first plate to locate the cavity of the second plate in registration with the cavity of the first plate and locating the wire along the vertical central longitudinal plane of the body cavity, holding the mold assembly in its closed position, introducing plastic materials into the body cavity through a passageway in the mold assembly, said plastic materials reacting to form a foamed plastic filling the body cavity and surrounding the wire located in said body cavity, allowing gas to exhaust from the body cavity through vent means in the mold assembly during the reaction of the plastic materials and filling of the body cavity with foamed plastic, terminating the exhaust of gas from the body cavity and continuing the reaction of the plastic materials to increase the density of the foamed plastic in the body cavity, opening the mold assembly by separating the first plate from the second plate, and removing the foamed plastic body and wire from the mold assembly.

9. The method of claim 8 wherein: said wire has a nose loop at the forward end thereof and a tail loop at the rear end thereof, said means for accommodating portions of the wire including first groove means on the first and second plates at the forward end of the body cavity and second groove means on the first and second plates at the rear end of the body cavity, including locating the nose loop in the first groove means, the tail loop in the second groove means, and the remainder of the wire along the vertical central longitudinal plane of the body cavity.

10. The method of claim 8 wherein: said wire has a nose loop, a body loop, and a tail loop, said means for accommodating portions of the wire comprising a first groove for accommodating the nose loop, a second groove to accommodating the body loop, and a third groove for accommodating the tail loop and including locating the nose loop in the first groove, the body loop in the second groove, the tail loop in the third groove, and the remainder of the one-piece wire being located along the vertical central longitudinal plane of the body cavity.

11. A method of making a foamed plastic body having a controlled density with a mold assembly having a first plate and a second plate adapted to be located in face-to-face relationship relative to each other, said first and second plates each having at least one cavity forming a body cavity having the outline shape of the body when the first and second plates are located in face-to-face relationship comprising: closing the mold assembly by mounting the second plate on the first plate to locate the cavity of the second plate in registration with the cavity of the first plate, holding the mold assembly in its closed position, introducing plastic materials into the body cavity through a passageway in the mold assembly, said plastic materials reacting to form a foamed plastic filling the body cavity, allowing gas to exhaust from the body cavity through vent means in the mold assembly during the reaction of the plastic materials and filling the body cavity with foamed plastic, terminating the exhaust of gas from the body cavity and continuing the reaction of the plastic materials to increase the density of the foamed plastic in the body cavity, opening the mold assembly by separating the first plate from the second plate, and removing the foamed plastic body from the mold assembly.

12. The method of claim 11 including: holding a wire between said first and second plates to locate wire in the body cavity, said plastic materials during the reaction thereof surrounding the wire in the body cavity.

13. The method of claim 11 wherein: a controlled amount of said plastic materials are introduced in the body cavity by injecting a selected amount of liquid plastic materials into the body cavity.

* * * * *

UNITED STATES PATENT AND TRADEMARK OFFICE
CERTIFICATE OF CORRECTION

PATENT NO. : 4,437,257
DATED : March 20, 1984
INVENTOR(S) : Douglas J. Kluge

It is certified that error appears in the above-identified patent and that said Letters Patent are hereby corrected as shown below:

Column 2, line 16, "framable" should be -- foamable --.

Column 6, line 31, "to" should be -- for --.

Signed and Sealed this

Second Day of October 1984

[SEAL]

Attest:

GERALD J. MOSSINGHOFF

Attesting Officer

Commissioner of Patents and Trademarks